United States Patent
Brezger et al.

(10) Patent No.: US 10,774,880 B2
(45) Date of Patent: Sep. 15, 2020

(54) DISK CLUTCH

(71) Applicant: BorgWarner Inc., Auburn Hills, MI (US)

(72) Inventors: Friedrich Philipp Brezger, Karlsruhe (DE); Klaus Wolk, Bidingen (DE)

(73) Assignee: BorgWarner Inc., Auburn Hills, MI (US)

( * ) Notice: Subject to any disclaimer, the term of this patent is extended or adjusted under 35 U.S.C. 154(b) by 58 days.

(21) Appl. No.: 16/195,922

(22) Filed: Nov. 20, 2018

(65) Prior Publication Data
US 2019/0154089 A1 May 23, 2019

(30) Foreign Application Priority Data

Nov. 22, 2017 (DE) .................. 10 2017 010 796
May 24, 2018 (DE) .................. 10 2018 004 193

(51) Int. Cl.
| | |
|---|---|
| *F16D 13/52* | (2006.01) |
| *F16D 63/00* | (2006.01) |
| *F16D 55/38* | (2006.01) |
| *F16D 25/0638* | (2006.01) |
| *F16D 67/04* | (2006.01) |
| *F16D 121/14* | (2012.01) |

(52) U.S. Cl.
CPC .......... *F16D 13/52* (2013.01); *F16D 25/0638* (2013.01); *F16D 55/38* (2013.01); *F16D 63/006* (2013.01); *F16D 67/04* (2013.01); *F16D 2121/14* (2013.01); *F16D 2300/00* (2013.01)

(58) Field of Classification Search
CPC ...... F16D 25/0638; F16D 13/52; F16D 11/00; F16D 2011/002
See application file for complete search history.

(56) References Cited

U.S. PATENT DOCUMENTS

| | | | |
|---|---|---|---|
| 9,222,549 B2 * | 12/2015 | Mellet ..................... F16H 3/62 |
| 10,563,704 B2 * | 2/2020 | Pritchard ............. B60K 17/344 |
| 2017/0241486 A1 * | 8/2017 | Pritchard ................. F16D 11/10 |

FOREIGN PATENT DOCUMENTS

| | | | |
|---|---|---|---|
| DE | 102004017123 A1 * | 10/2005 | ......... F16H 63/3026 |
| WO | WO-2015072912 A1 * | 5/2015 | ............. B60T 10/02 |

OTHER PUBLICATIONS

Machine translation of DE-102004017123-A1, retrieved from www.espacenet.com (Year: 2020).*

* cited by examiner

*Primary Examiner* — Stacey A Fluhart
(74) *Attorney, Agent, or Firm* — Howard & Howard Attorneys PLLC

(57) ABSTRACT

The present invention relates to a disk clutch (2) comprising a first disk carrier (18), a second disk carrier (24), and a disk set (34) assigned to the first and second disk carriers (18, 24), wherein the first and second disk carriers (18, 24) may be brought in a friction-locking way into rotary driving connection with one another via the disk set (34), and the first and the second disk carrier (18, 24) may additionally be brought in a positive-locking way into rotary driving connection with one another.

20 Claims, 4 Drawing Sheets

DISK CLUTCH

CROSS-REFERENCE TO RELATED APPLICATIONS

Figure 1:
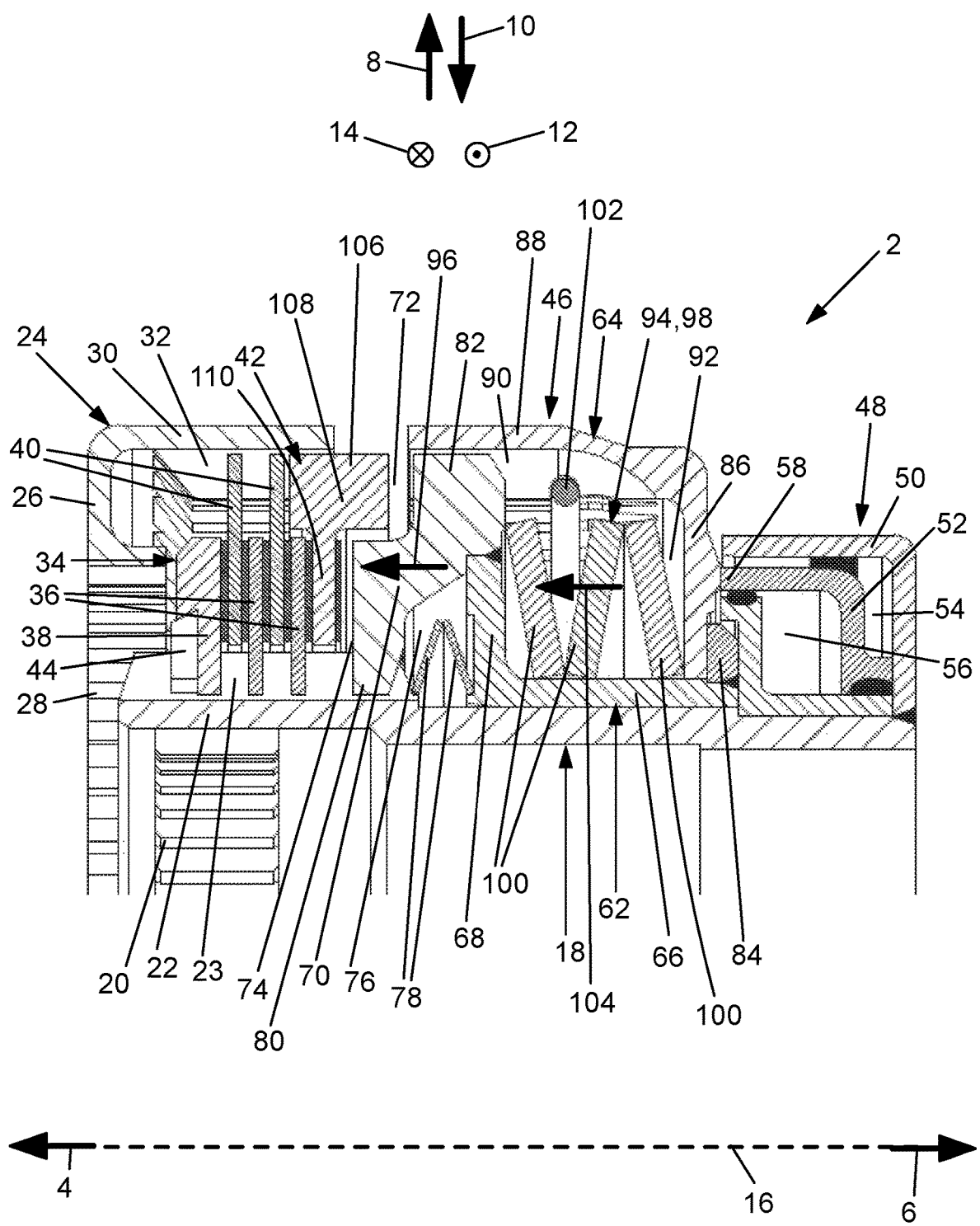

This application claims the benefit of German Patent Application No. 102017010796.3 filed Nov. 22, 2017, and German Patent Application No. 102018004193.0 filed May 24, 2018, the disclosure of which is herein incorporated by reference in its entirety.

DESCRIPTION

The present invention relates to a disk clutch comprising a first disk carrier, a second disk carrier, and a disk set assigned to the first and second disk carriers, wherein the first and second disk carriers may be brought into rotary driving connection with one another in a friction-locking way via the disk set.

Disk clutches are known from practice that have an outer disk carrier, and inner disk carrier, and a disk set arranged between the outer and inner disk carriers. In order to achieve a friction-locking rotary driving connection between the outer disk carrier and the inner disk carrier, an actuating device is additionally assigned to the disk set, by means of which actuating device an actuating force may be applied to the disk set which functions to compress the disk set and thus to achieve a friction-locking connection between the outer and inner disk carriers. In order to be able to transfer a particularly high torque via the disk set, the actuating force must have a particularly high value. In other words, a relatively high actuating force is required in order to achieve a correspondingly high rotary driving transmission capacity of the disk clutch. In this context, actuating devices were developed for applying the actuating force, whose actuating element, which acts on the disk set, may be locked in its actuating position in order to be able to continuously exert a correspondingly high actuating force on the disk set. After a corresponding locking of the actuating element, the energy requirement of the predominantly hydraulically driven actuating device might be reduced by this method. However, a significantly higher torque transmission capacity of the disk clutch is not achieved by this.

It is therefore the object of the present invention to create a disk clutch which has on the one hand a large torque transmission capacity and on the other hand a simple and space-saving design.

This problem is solved by the features listed in Claim 1. Advantageous embodiments of the invention are the subject matter of the subclaims.

The disk clutch according to the invention has a first disk carrier, a second disk carrier, and a disk set assigned to the first and second disk carriers. Even though a disk clutch is consistently discussed here, the present invention also comprises disk brakes in which a stationary disk carrier may be designed. The first disk carrier may be designed, for example, as an outer or inner disk carrier, while the second disk carrier may be designed as an inner or outer disk carrier. The disk set assigned to the two disk carriers may, in contrast, be composed of outer and inner disks, which preferably alternate in sequence. The first disk carrier and the second disk carrier may be brought into rotary driving connection with one another in a friction-locking way via the disk set, in that the disk set is compressed, for example, by a corresponding actuating device. In addition, the first disk carrier and the second disk carrier may be brought in a positive-locking way into rotary driving connection with one another, so that a torque may be transferred between the two disk carriers in a positive-locking way, and thus a significantly higher torque transmission capacity of the disk clutch may be achieved due to a positive-locking rotary driving connection than is the case in the friction-locking rotary driving connection via the disk set alone.

In one preferred embodiment of the disk clutch according to the invention, the first and second disk carriers may be brought into a rotary driving connection with one another in a friction-locking way by an actuating device, wherein an actuating force, preferably an axial force, may be applied to the disk set by means of the actuating device. The actuating device may basically be driven in any way; however, it is preferred if the actuating device is a hydraulically-drivable or a hydraulically-driven actuating device.

In another preferred embodiment of the disk clutch according to the invention, the first and second disk carriers may be brought into rotary driving connection with one another in a friction-locking way via the actuating device. This has the advantage that, by using the actuating device which is already present and which may bring the first and second disk carriers into rotary driving connection with one another in a friction-locking way by compressing the disk set, the first and second disk carrier may also be brought into rotary driving connection with one another in a positive-locking way, so that an actuating device, already necessary for the disk set, may also cause the selective positive locking between the two disk carriers in a simple and space-saving way. An additional positive-locking device for achieving the positive fit between the first and second disk carriers may thus be largely dispensed with, so that the disk clutch may have a relatively simple and space-saving design, as is also the case in conventional disk clutches.

In one advantageous embodiment of the disk clutch according to the invention, the actuating device is in a positive-locking rotary driving connection with the first disk carrier, wherein the actuating device is thereby preferably continuously in positive-locking rotary driving connection with the first disk carrier.

In one particularly preferred embodiment of the disk clutch according to the invention, the actuating device may be brought into rotary driving engagement in a positive-locking way with an end disk of the disk set to achieve the positive-locking rotary driving connection between the first and second disk carriers. In this way, a most direct, positive-locking rotary driving connection between the first disk carrier and the second disk carrier may be achieved by means of the actuating device and the end disk, by which means a space-saving design of the disk clutch is achieved.

It is additionally preferred in this embodiment if, to achieve the positive-locking rotary driving connection between the first and second disk carriers, the actuating device is in rotary driving engagement with a toothing of the end disk, which is in rotary driving engagement with the second disk carrier, a toothed section of the second disk carrier, or a disk support section of the second disk carrier, in order to also use an already necessary component of the end disk, in this case the toothing of the end disk, in an advantageous way for the positive-locking rotary driving engagement. It has additionally proven advantageous hereby, if the toothing of the end disk is designed to be wider than the toothing of the other disks of the disk set in order to both be securely in rotary driving engagement with the second disk carrier, the toothed section of the second disk carrier, or a disk support section of the second disk carrier on the one hand, and also to be able to be brought securely into rotary driving engagement with the actuating device to achieve the positive-locking rotary driving connection between the first and second disk carriers on the other hand. Thus, the toothing of the end disk may, for example, project in an axial direction beyond the second disk carrier, its toothed section, or its disk support section in order to be able to bring the actuating device into rotary driving engagement with the projecting section of the toothing of the end disk in an easy way.

In another advantageous embodiment of the disk clutch according to the invention, the actuating device may be displaced from a first position, in which the first and second disk carriers are decoupled from one another at least via the actuating device itself, into a second position, in which a friction connection exists between the first and second disk carriers via the disk set. Furthermore, the actuating device may be displaced from the second position into a third position, in which the first and second disk carriers are in a positive-locking rotary driving connection with one another. The positive-locking rotary driving connection between the first and second disk carriers might thereby also be carried out basically via a separate positive-locking device which is actuated by the actuating device or by its displacement from the second position into the third. However, it is hereby preferred if, in the third position of the actuating device, the first and second disk carrier are in a positive-locking rotary driving connection with one another via the actuating device itself, optionally also via the previously mentioned end disk of the disk set, as this was previously indicated.

According to another advantageous embodiment of the disk clutch according to the invention, the actuating device is displaceable from the first position into the second position and in the same direction from the second position into the third position. As already explained, the direction is thereby preferably an axial direction. In any case, it is advantageous if the actuating device is displaceable from the first position into the second and in the same direction from the second position into the third, particularly as the friction connection between the two disk carriers and consequently their substantial speed adjustment may thereby be initially achieved in the second position, before the positive locking is effected between the two disk carriers upon further movement in the same direction. Consequently, the friction-locking and the positive-locking rotary driving connections may be achieved successively or consecutively, wherein for this purpose only the actuating device needs to be moved in the same direction. It may be generally stated here that a friction-locking rotary driving connection of the disk carriers is necessarily achieved between the first position and the third position of the actuating device. It is also preferred in this embodiment, if the actuating device is designed in such a way that in the third position, both the friction-locking rotary driving connection achieved in the second position and also the positive-locking rotary driving connection necessarily exist.

In another preferred embodiment of the disk clutch according to the invention, the actuating device has a first actuating element, via which the actuating force may be applied to the disk set, and a second actuating element for driving the first actuating element and on which the first actuating element is supported or supportable preferably in the axial direction. The actuating force is thereby preferably directly applicable on the disk set via the first actuating element. In this embodiment, the actuating device is thus designed as at least two parts or two pieces. The assembly of the actuating device from the first and second actuating elements has the advantage that these may be precisely adapted for the function assigned to them. Thus, the first actuating element may, in particular be adapted with respect to the application on the disk set, while the second actuating element may be adapted in particular with respect to its function, thus, for example, achieving a positive-locking rotary driving connection between the first and second disk carriers via this second actuating element. The manufacturing is also simplified hereby, particularly as the waste material is lower for functionally separate and discrete actuating elements than would be the case for two actuating sections designed as one piece with one another. In addition, the subdivision of the actuating device into a first and a second actuating element facilitates a relative movement between the two actuating elements, as this will be subsequently explained in greater detail by way of another advantageous embodiment.

In another preferred embodiment of the disk clutch according to the invention, the first actuating element may be moved relative to the second actuating element from an initial position into a retracted position by the displacement of the actuating device from the second position into the third. This is advantageous in so far as additional actuation of the actuating device remains possible, so that this may be displaced into the third position via the second actuating element, without, however, substantially increasing the force applied on the disk set via the first actuating element, particularly as the friction connection between the first and second disk carriers may already be substantially achieved via the disk set in the second position of the actuating device.

According to a particularly advantageous embodiment of the disk clutch according to the invention, the second actuating element may be brought into positive-locking rotary driving engagement with the second disk carrier, optionally the toothed section or the disk support section of the second disk carrier by means of the end disk in order to effect the positive-locking rotary driving connection between the first and second disk carriers via the actuating device and said end disk in a particularly space-saving way.

In another advantageous embodiment of the disk clutch according to the invention, the first actuating element is supported or supportable on the second actuating element via a reset device for resetting the first actuating element into its initial position. Consequently, the first actuating element is displaceable relative to the second actuating element counter to a reset force of the reset device from the initial position into the retracted position. The reset force of the reset device should thereby be measured in such a way that the first actuating element is only then displaced relative to the second actuating element from the initial position into the retracted position counter to the reset force of the reset device, if a correspondingly high actuating force is applied to the disk set via the first actuating element, said actuating force being suited for closing the disk clutch already friction-locked via the disk set, in order to achieve a substantial adjustment of the speeds of the first and second disk carriers.

In another particularly advantageous embodiment of the disk clutch according to the invention, the reset device has a spring device for generating a spring force, from which the previously mentioned reset force of the reset device results. It is thereby preferred if the spring device has at least one disk spring or helical spring, wherein a spring device made from a disk spring set having at least two disk springs has proven particularly advantageous. It has also proven helpful if each of the disk springs in sequence of the disk spring set have a conicity opposite one another.

Basically, the previously mentioned spring device may be arranged in such a way that only a small part of the spring force applied by the spring device constitutes the resulting reset force of the reset device. However, it has been shown that by this means, in particular during the displacement of the actuating device from the third position into the second position, an at least temporary drop of the torque transmission capacity of the disk clutch occurs, which is not present during a previous displacement from the second position into the third position. To counteract this, the spring device is arranged in another particularly advantageous embodiment of the disk clutch according to the invention in such a way that the spring force of the spring device acts substantially in the same direction as the reset force, wherein it is preferred if the spring force of the spring device defines an angle of less than 45° with the resulting reset force. It has hereby proven particularly advantageous if the spring force of the spring device is aligned parallel to the resulting reset force, in order to achieve a resulting reset force that substantially corresponds to the spring force of the spring device, and thus a temporary drop of the torque transmission capacity is prevented during the displacement from the third position of the reset device into the second position.

In another advantageous embodiment of the disk clutch according to the invention, the spring force of the spring device, optionally also the reset force, acts in the axial direction of the disk clutch.

Alternatively or supplementally to the two previously described embodiments, in another particularly advantageous embodiment of the disk clutch according to the invention, the reset force resulting from the spring force of the spring device substantially corresponds to the spring force of the spring device, wherein the resulting reset force is preferably more than 50%, particularly preferably more than 90% of the spring force of the spring device in order to prevent a drop, even if only a short one, of the torque transmission capacity during displacement of the actuating device from the third position into the second position.

In another advantageous embodiment of the disk clutch according to the invention, the second actuating element is in positive-locking rotary driving connection with the first disk carrier via the first actuating element.

According to another advantageous embodiment of the disk clutch according to the invention, the first actuating element is designed as disk-like and/or annular, in order to be able to act on the disk set, optionally the previously described end disk, in a suitable way. In this way, the actuating force is transferred relatively uniformly to the disk set. It may hereby be advantageous if at least one component or a part of the first actuating element is designed as disk-like and/or annular, while, for example, another component interacts with the second actuating element and/or functions for support or accommodation of the reset device and/or of the spring device of the reset device or also for guiding the reset device, optionally along the first disk carrier.

In another preferred embodiment of the disk clutch according to the invention, the first and second disk carriers are in positive-locking rotary driving connection with one another. Thus, the first actuating element preferably has a toothing which is in rotary driving engagement with a toothing on the second actuating element.

According to another advantageous embodiment of the disk clutch according to the invention, the first actuating element is in positive-locking rotary driving connection with the first disk carrier, wherein the first actuating element preferably has a toothing which is in rotary driving engagement with a toothed section or a disk support section of the first disk carrier. In this way, the already present toothed section or disk support section of the first disk carrier is also used for achieving the positive-locking rotary driving connection with the first actuating element, by which means a simple and compact design is achieved and the manufacturing is simplified.

In another preferred embodiment of the disk clutch according to the invention, a stop is provided between the first and second actuating elements via which the first actuating element is supported or supportable on the second actuating element in the retracted position. The stop is thereby preferably arranged on the first or second actuating element in such a way that after achieving the retracted position, further compression or a solid compression of the spring device of the reset device is prevented. It has additionally proven advantageous, in the sense of a simplified and easily manufacturable design of the disk clutch, if the stop is detachably arranged on the first or second actuating element and/or is designed as a retaining ring.

According to another advantageous embodiment of the disk clutch according to the invention, the previously mentioned toothing on the second actuating element, which functions for the positive-locking rotary driving connection with the first actuating element, may be brought into positive-locking rotary driving engagement with the previously mentioned end disk of the disk set, preferably with the toothing of the end disk, while achieving the positive-locking rotary driving connection between the first and second disk carriers. Consequently, the already present toothing on the second actuating element, which functions for the positive-locking rotary driving connection with the first actuating element, is also used for achieving the positive-locking rotary driving connection between the first and second disk carriers via the end disk, by which means the design of the disk clutch is significantly simplified.

Figure 2:
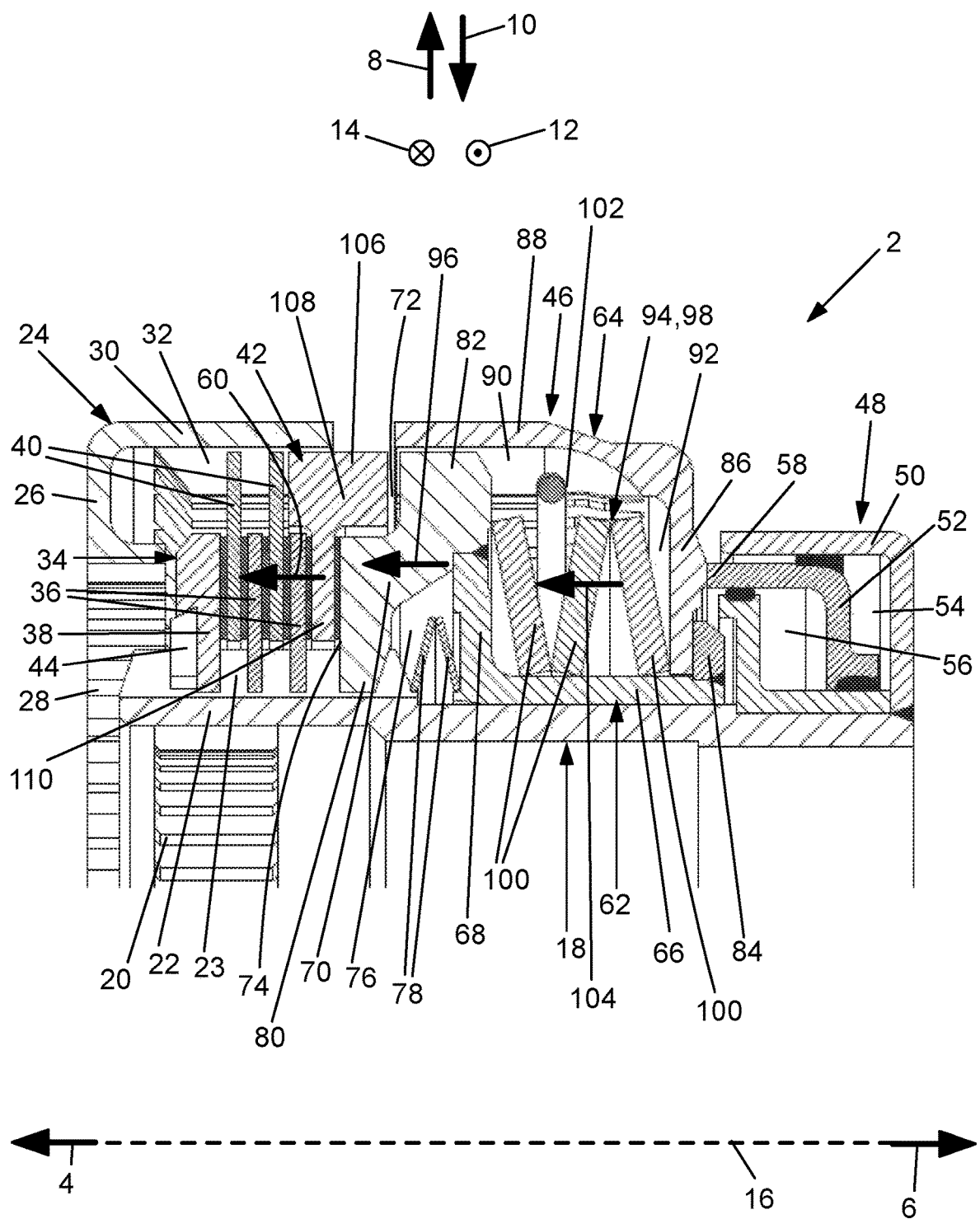
Figure 3:
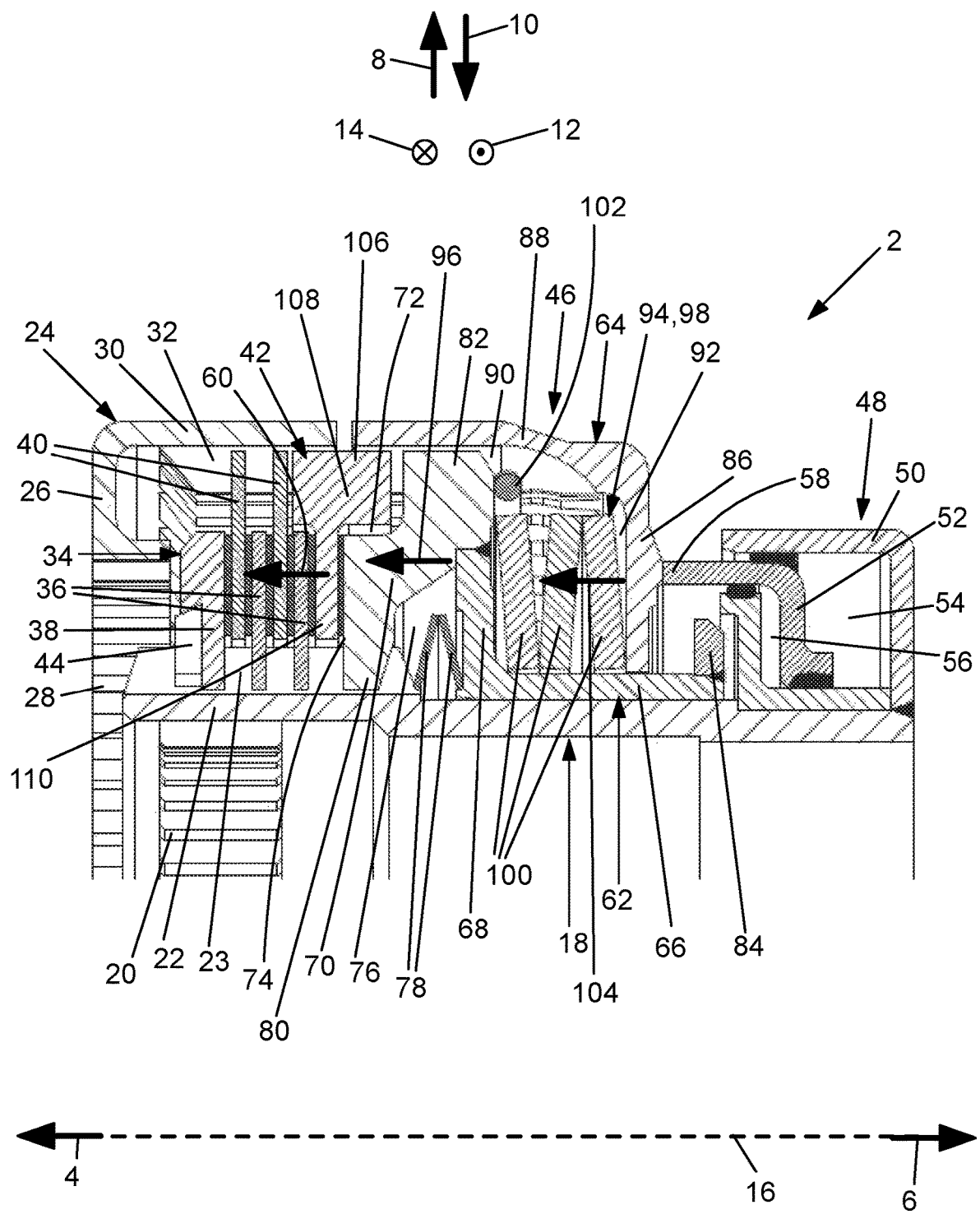
Figure 4:
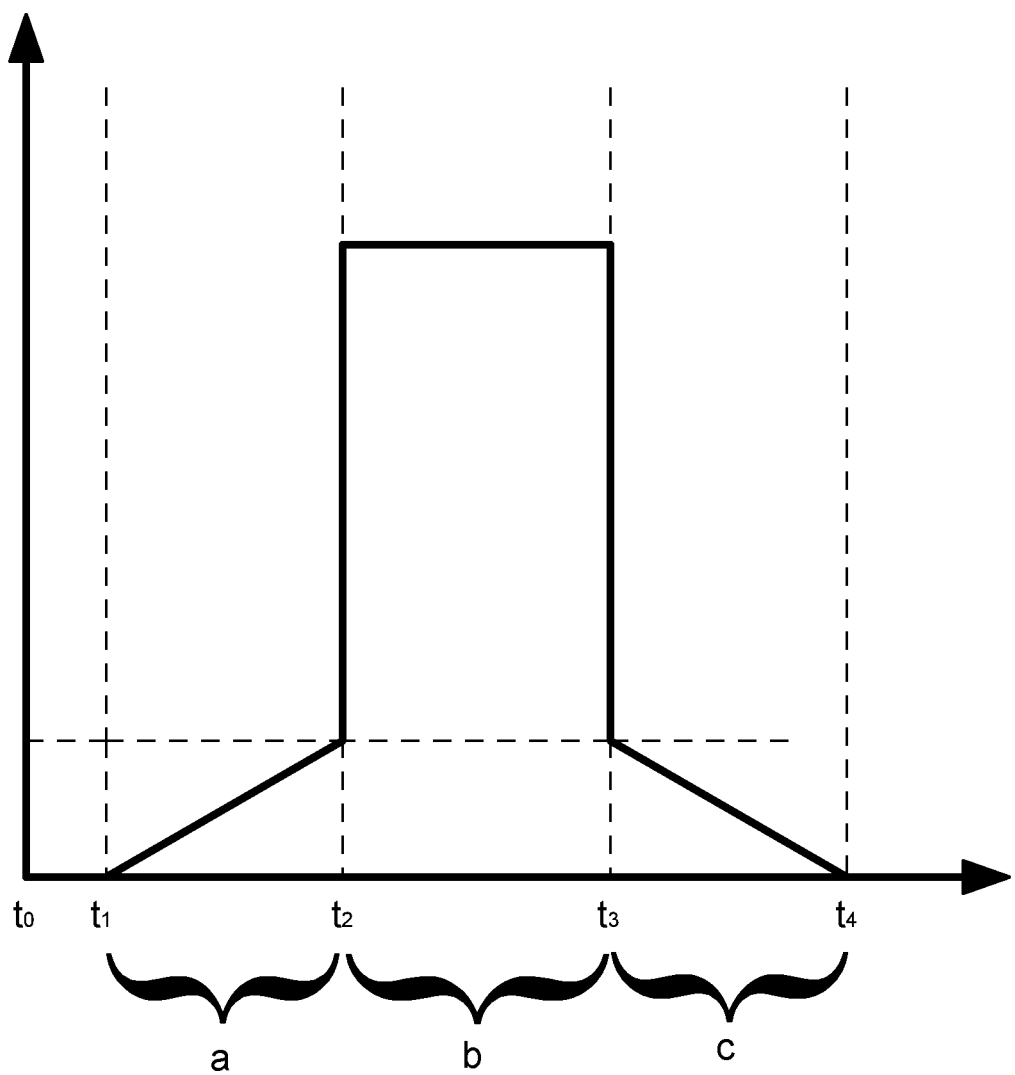

The invention will be subsequently described in greater detail with the aid of an exemplary embodiment with reference to the appended drawings. As shown in:

FIG. 1 a partial side view of a disk clutch in a sectional view with the actuating device in a first position, FIG. 2 the disk clutch from FIG. 1 with the actuating device in a second position, FIG. 3 the disk clutch from FIGS. 1 and 2 with the actuating device in a third position, and FIG. 4 the torque transmission capacity applied over time to the disk clutch in the different positions of the actuating device from FIGS. 1 through 3.

FIGS. 1 through 3 show a disk clutch 2. Even if a disk clutch 2 is consistently discussed herein, this also comprises correspondingly designed disk brakes. In the figures, opposite axial directions 4, 6, opposite radial directions 8, 10, and opposite circumferential directions 12, 14 of disk clutch 2 are indicated by means of corresponding arrows, wherein disk clutch 2 or its components are rotatable about an axis of rotation 16 extending in axial directions 4, 6. Circumferential directions 12, 14 may thereby also be designated as rotational directions.

Disk clutch 2 has a first disk carrier 18. First disk carrier 18 is designed here as a so-called inner disk carrier. First disk carrier 18 is designed as substantially tubular and extends in axial directions 4, 6, wherein a rotary driving contour 20 in the form of a toothing is provided on the side facing inward in radial direction 10. On the end lying in axial direction 4, tubular first disk carrier 18 has a disk support section 22, and a toothing 23 is provided on the side thereof facing outward in radial direction 8. Disk support section 22 or its toothing 23 is arranged nested with rotary driving contour 20 in radial direction 8, 10.

Furthermore, disk clutch 2 has a second disk carrier 24 which is designed here as an outer disk carrier. Thus, second disk carrier 24 has a support section 26, which extends substantially in radial direction 8, 10, and a rotary driving contour 28 in the form of a toothing is provided on the side of the support section facing inward in radial direction 10. The end facing outward in radial direction 8 connects to a disk support section 30, which is designed as substantially tubular and extends, starting from support section 26, in axial direction 6. A toothing 32 is provided in turn on the side of disk support section 30 facing inward in radial direction 10.

A disk set 34, via which first and second disk carriers 18, 24 may be brought in a friction-locking way into rotary driving connection with one another, is assigned to first and second disk carriers 18, 24. Disk set 34 has first disks 36 and an end disk 38, which are respectively designed as inner disks, and are in rotary driving engagement with toothing 23 of disk support section 22, nevertheless, they are displaceable in axial direction 4, 6 relative to disk support section 22, and second disks 40 and an end disk 42, which are designed as outer disks and are in rotary driving connection with toothing 32 of disk support section 30, wherein second disks 40 and end disk 42 are also displaceable in axial direction 4, 6, relative to disk support section 30. Second disks 40 and end disk 42 designed as outer disks and first disks 36 and end disk 38 designed as inner disks follow one another alternatingly in axial direction 4, 6, wherein end disk 42 forms the end of disk set 34 facing in axial direction 6, while end disk 38 forms the end of disk set 34 facing in axial direction 4. End disk 38 is supported or supportable in axial direction 4 on first disk carrier 18 via a retaining ring 44.

In axial direction 6, disk set 34 is followed by an actuating device 46, which is hydraulically driven or drivable via a piston-cylinder unit 48 which follows actuating device 46 in axial direction 6. Piston-cylinder unit 48 has an annular cylinder 50 which is connected rotationally fixed to first disk carrier 18, in this case welded to first disk carrier 18. A piston 52, displaceable in axial directions 4, 6 and arranged within cylinder 50, divides the interior of cylinder 50 into a first pressure chamber 54 on one side and a second pressure chamber 56 on the other side, wherein piston 52 is designed as an annular piston and first and second pressure chambers 54, 56 are each designed as annular pressure chambers 54, 56. Second pressure chamber 56 may function here as a pressure compensation chamber, particularly as cylinder 50 rotates together with first disk carrier 18 during operation of disk clutch 2, so that second pressure chamber 56 is capable of effecting centrifugal oil compensation. By applying hydraulic pressure to first pressure chamber 54, piston 52 may be displaced in axial direction 4 in order to act with its actuating end 58 on actuating device 46, by means of which in turn first and second disk carriers 18, 24 may be brought in a friction-locking way into rotary driving connection with one another, in that actuating device 46 acts on disk set 34 or compresses the same. An actuating force 60 acting in axial direction 4 is thereby applicable on disk set 34, which is indicated in FIGS. 2 and 3 by way of an arrow.

Actuating device 46 substantially comprises a first actuating element 62 and a second actuating element 64. First actuating element 62 has a substantially tubular first section 66 extending in axial directions 4, 6 which is supported or supportable in radial direction 8, 10 on the side of first disk carrier 18 facing outward in radial direction 8. First section 66 connects in axial direction 4 to a section 68 which, starting from first section 66, extends substantially outward in radial direction 8. First and second sections 66, 68 are thereby designed as one piece with one another. The end of second section 68 facing outward in radial direction 8 connects in turn to a third section 70 of first actuating element 62, wherein third section 70 extends in turn substantially in radial direction 8, 10; however, it is recessed in its area lying outward in radial direction 8 to form an annular space 72 in axial direction 6. Third section 70 projects in axial direction 4 in its area lying inward in radial direction 10 in order to be able to interact with end disk 42 of disk set 34 via an actuating surface 74 facing in axial direction 4, as this will be explained again later in greater detail.

Third section 70 is not designed as one piece with first and second sections 66, 68, but instead is welded to them, wherein a spring accommodation space 76 is formed in axial direction 4, 6 between third section 70 and second section 68. At least one spring element 78 is arranged within spring accommodation space 76, in this case, two disk springs, wherein the at least one spring element 78 is supported or supportable in axial direction 4 on first disk carrier 18, in this case on toothing 23 of disk support section 22, and in axial direction 6 on second section 68 of first actuating element 62. Spring element 78 functions for resetting actuating device 46 into the first position as shown in FIG. 1, described later in greater detail, if hydraulic pressure is not applied or is no longer applied to first pressure chamber 54.

Third section 70 of first actuating element 62 is designed substantially as a type of disk and has a toothing 80 on its side facing inward in radial direction 10, said toothing being in rotary driving engagement with toothing 23 of disk support section 22, so that first actuating element 62 is in positive-locking rotary driving connection with first disk carrier 18. Despite the rotary driving engagement, it is, however, possible to displace first actuating element 62 in axial direction 4, 6 relative to first disk carrier 18. On its end facing outward in radial direction 8, third section 70 has another toothing 82, which is consequently designed as an outer toothing and functions for the rotary entrainment coupling between first actuating element 62 and second actuating element 64, subsequently described in greater detail. In addition, an annular support part 84 is fixed on the end of first section 66 facing in axial direction 6, in this case welded, which projects outward in radial direction 8 beyond first section 66 of first actuating element 62.

Second actuating element 64 of actuating device 46 is designed, like first actuating element 62, to be displaceable in axial direction 4, 6 relative to first disk carrier 18, wherein first and second actuating elements 62, 64 are mutually displaceable in axial direction 4, 6 relative to one another. Second actuating element 64 has a first section 86, extending substantially in radial direction 8, 10, which is supported or supportable in axial direction 6 on support part 84 of first actuating element 62 using its end facing inward in radial direction 10. A second section 88 connects outwardly in radial direction 8 to first section 86, wherein second section 88 is designed as substantially tubular and extends, starting from first section 86, in axial direction 4. Second section 88 is thereby designed like a disk support section, consequently this has a toothing 90 facing inward in radial direction 10. Toothing 82 of third section 70 of first actuating element 62 engages into this toothing 90, so that first and second actuating element 62, 64 are in positive-locking rotary driving connection with one another. First and second sections 86, 88 of second actuating element 64 are in turn designed as one piece with one another. Toothing 90 also substantially corresponds to toothing 32 with respect to number of teeth and tooth width. The tip and root diameters of the two toothings 32, 90 are designed as identical in the embodiment shown.

First and second actuating element 62, 64 delimit an inner free space 92 which is designed extending annularly in circumferential direction 12, 14. Stated more precisely, free space 92 is delimited in radial direction 10 and in axial direction 4 by first actuating element 62, and in radial direction 8 and in axial direction 6 by second actuating element 64. Free space 92 functions substantially to accommodate a reset device 94, via which first and second actuating elements 62, 64 are supported or supportable in axial direction 4, 6 on one another. Stated more precisely, first actuating element 62 is supportable in axial direction 6 on second actuating element 64 via reset device 94, while second actuating element 64 is supported or supportable in axial direction 4 on first actuating element 62 via reset device 94. Reset device 94 functions for resetting first actuating element 62 into its initial position as shown in FIGS. 1 and 2. Consequently, first actuating element is displaceable in axial direction 6 relative to second actuating element 64 counter to a reset force 96 of reset device 94 from the initial position, according to FIGS. 1 and 2, into a retracted position, as is indicated in FIG. 3.

Reset device 94 is formed substantially by a spring device 98, which may be formed, for example, by one or multiple disk springs or helical springs. In the embodiment shown, spring device 98 is formed by at least two, in this case three disk springs 100, wherein disk springs 100, which directly follow one another, each have a conicity opposite one another. Thus, end side disk spring 100, arranged in axial direction 4, is supported on first actuating element 62, stated more precisely, on third or second section 70; 68, while end side disk spring 100 lying in axial direction 6 is supported on second actuating element 64, stated more precisely, on first section 86 of second actuating element 64. In the initial position of first actuating element 62 relative to second actuating element 64, shown in FIGS. 1 and 2, first section 86 of second actuating element 64 is thus supported by spring device 98 against support part 84 on first actuating element 62.

In addition, reference is made to the stop 102 between first and second actuating elements 62, 64, via which first actuating element 62, in the retracted position according to FIG. 3, is supported or supportable in axial direction 6 on second actuating element 64, in order to prevent further compression of spring device 98 and/or a solid compression of spring device 98. As is clear from the figures, stop 102 is arranged preferably detachably on first or second actuating element 62, 64, in this case second actuating element 64, wherein stop 102 is formed particularly preferably by a retaining ring which is arranged in a corresponding groove within toothing 90 in order to effect a support of third section 70 of first actuating element 62 in axial direction 6 via the retaining ring on second actuating element 64, when first actuating element is located in the retracted position according to FIG. 3.

Spring device 98 generates a spring force 104 through compression of the same, from which ultimately the reset force results which acts on first actuating element 62 in axial direction 4. Spring device 98 is preferably biased in the initial position of first actuating element 62. Spring force 104 acts substantially in the same direction as reset force 96, in this case in axial direction 4. Basically, spring force 104 is to define an angle of less that 45° with resulting reset force 96 and—as in the present embodiment—be aligned parallel to resulting reset force 96. This is achieved by the corresponding arrangement of spring device 98, wherein both spring force 104 and also reset force 96 resulting therefrom act in axial direction 4 so that resulting reset force 96 substantially corresponds to spring force 104. Basically, the resulting reset force 96 is to be more than 50%, preferably more than 90% of spring force 104, which spring device 98 applies during its compression.

Actuating device 46 is designed as a continuous module whose components are arranged captively next to one another. This means that first actuating element 62, second actuating element 64, reset device 94, its spring device 98, and stop 102 are arranged captively next to one another, so that the module formed therefrom may be easily pushed in axial direction 4 onto first disk carrier 18 in the context of the assembly before piston-cylinder unit 48 is fixed on first disk carrier 18. Spring element 78 is to be or might also thereby already be formed within spring accommodation space 76 as part of such a module. In the installed state, first actuating element 62 is in positive-locking rotary driving connection with toothing 23 of disk support section 22 via toothing 82 and thus in positive-locking rotary driving connection with first disk carrier 18. This correspondingly applies for second actuating element 64, particularly as this is in rotary driving engagement with first actuating element 62 via toothing 82 on first actuating element 62 and toothing 90 on second actuating element 64, so that the entire actuating device 46 is in positive-locking rotary driving connection with first disk carrier 18.

Previously mentioned end disk 42 has a toothing 106, facing outward in radial direction 8, which is in rotary driving engagement with toothing 32 on second disk carrier 24. As is clear from the figures, toothing 106 of end disk 42 is designed as at least wider than the toothing on second disks 40, wherein toothing 106 in the embodiment shown is designed as wider than all external or internal toothings of disks 36, 38, 40. The width of a toothing is hereby understood to be its extension in axial direction 4, 6. An outer area 108 of end disk 42 extending outward in radial direction 8 is thereby designed as wider in axial direction 4, 6 than an inner area 110 extending inward in radial direction 10, wherein toothing 106 engages on the one side in toothing 32 of second disk carrier 24 and on the other side projects in axial direction 6 beyond the end of disk support section 30 of second disk carrier 24.

Additional features of disk clutch 2 and its functioning will subsequently be described with reference to FIGS. 1 through 4.

FIG. 1 shows actuating device 46 in a first position. In the first position, first and second disk carriers 18, 24 are decoupled from one another so that neither a friction-locking nor a positive-locking rotary driving connection exists between first and second disk carrier 18, 24. Inside of actuating device 46, first actuating element 62 assumes an initial position relative to second actuating element 64, into which position it is biased via reset force 96 of reset device 94.

In order to establish a friction-locking rotary driving connection between first disk carrier 18 and second disk carrier 24 via disk set 34, actuating device is displaced from the first position according to FIG. 1 into the second position according to FIG. 2. For this purpose, hydraulic pressure is applied to first pressure chamber 54 so that piston 52 is forced in axial direction 4 in order to act on second actuating element 64 of actuating device 46 via actuating end 58, which is consequently displaced, together with first actuating element 62, counter to the reset force of spring elements in axial direction 4 against disk set 34. In the second position, actuating surface 74 of first actuating element 62 presses against end disk 42 so that disk set is compressed, and a frictional connection exists between the first and second disk carriers 18, 24 via disk set 34 in the second position. The wider, outer area 108 of end disk 42 is also immersed in axial direction 6 more deeply into annular free space 72 on first actuating element 62, without colliding with the same. In contrast, first actuating element 62 remains located in its initial position relative to second actuating element 64.

In the diagram according to FIG. 4, in which the torque transmission capacity is pictured over time, the time interval a between times $t_1$ and $t_2$ is indicated in which actuating device 46 is located in the second position, wherein at time $t_1$, a frictional connection is initially established via disk set 34 and the torque transmission capacity of disk clutch 2 correspondingly increases during a stronger compression of disk set 34. First actuating element 62, more precisely, its third section 70, thereby directly applies actuating force 60 on disk set 34 or end disk 42.

Over the course of increasing compression of disk set 34 via actuating device 46, both the torque transmission capacity increases and also spring force 104 of spring device 98, and consequently reset force 96 resulting therefrom, so that first actuating element 62 is displaced relative to second actuating element 64 in axial direction 6, wherein it may also be stated that a displacement of second actuating element 64 relative to first actuating element 62 in axial direction 4 occurs. By this means, first actuating element 62 remains analogously in its position relative to first disk carrier 18, while second actuating element 64 is further displaced in axial direction 4 relative to first disk carrier 18.

In this way, actuating device 46 arrives at time $t_2$ in FIG. 4 in a third position, which is shown in FIG. 3. In the third position, first and second disk carriers 18, 24 are in positive-locking rotary driving connection with one another via actuating device 46, wherein actuating device 46 is displaced for this purpose in the same axial direction 4 from the first position into the second, and from the second position into the third. Stated more precisely, actuating device 46 is brought in a positive-locking way into rotary driving engagement with end disk 42 of disk set 34 to achieve the positive-locking rotary driving connection between first and second disk carriers 18, 24. Thus, due to the displacement of second actuating element 64 relative to first disk carrier 18 in axial direction 4 in the third position according to FIG. 3, toothing 90 engages into the section projecting in axial direction 6 of toothing 106 of end disk 42 so that second actuating element 64 is brought in a positive-locking way by means of end disk 42 into rotary driving engagement with second disk carrier 24, stated more precisely, with its disk support section or its toothing 32. Consequently, in the third position of actuating element 46 according to FIG. 3, a positive-locking rotary driving connection exists between first disk carrier 18 and second disk carrier 24 via toothing 23 on first disk carrier 18, toothing 80 of first actuating element 62 engaging in toothing 23, first actuating element 62, toothing 82 on first actuating element 62, toothing 90 on second actuating element 64 being in rotary driving engagement with toothing 82, toothing 106 on end disk 42 being in rotary driving engagement with toothing 90, and toothing 32 of second disk carrier 24, which is likewise in rotary driving engagement with toothing 106 of end disk 42.

In the third position of actuating device 46, disk clutch 2 has a significantly increased torque transmission capacity, as is indicated in FIG. 4 by way of time interval b between times $t_2$ and $t_3$. If actuating device 46 is to be displaced back into the second position at time $t_3$, then the torque transmission capacity drops significantly again, particularly as at time $t_3$ only the friction-locking rotary driving connection exists via disk set 34. Due to the previously described arrangement of spring device 98 or the relationships between spring force 104 and reset force 96, the torque transmission capacity does not, however, drop below the level that existed at the end of time interval a, before the positive locking connection was achieved, or at most only for a very short time interval. In case of further pressure reduction within first pressure chamber 54, the torque transmission capacity drops back, starting at time $t_3$ in time interval c up to time $t_4$, when the first position of actuating device 46 is achieved again, in which the first and second disk carriers 18, 24 are decoupled from one another. A corresponding resetting of actuating device 46 into the first position is thereby effected by the reset force of spring element 78.

REFERENCE SIGN LIST

2 Disk clutch
4 Axial direction
6 Axial direction
8 Radial direction
10 Radial direction
12 Circumferential direction
14 Circumferential direction
16 Axis of rotation
18 First disk carrier
20 Rotary driving contour
22 Disk support section
23 Toothing
24 Second disk carrier
26 Support section
28 Rotary driving contour
30 Disk support section
32 Toothing
34 Disk set
36 First disks
38 End disk
40 Second disks
42 End disk
44 Retaining ring
46 Actuating device
48 Piston-cylinder unit
50 Cylinder
52 Piston
54 First pressure chamber
56 Second pressure chamber
58 Actuating end
60 Actuating force
62 First actuating element
64 Second actuating element
66 First section
68 Second section
70 Third section
72 Annular space
74 Actuating surface
76 Spring accommodation space
78 Spring element
80 Toothing
82 Toothing
84 Support part
86 First section
88 Second section
90 Toothing
92 Free space
94 Reset device
96 Reset force 98 Spring device
100 Disk springs
102 Stop
104 Spring force
106 Toothing
108 Outer area
110 Inner area
a Time interval
b Time interval
c Time interval
$t_0$ Time
$t_1$ Time
$t_2$ Time
$t_3$ Time
$t_4$ Time

The invention claimed is:

1. A disk clutch (2) comprising a first disk carrier (18), a second disk carrier (24), and a disk set (34) assigned to the first and second disk carriers (18, 24),
    wherein the first and second disk carriers (18, 24) are brought in a friction-locking way into rotary driving connection with one another by an actuating device (46), by means of which an actuating force (60) is applied on the disk set (34), wherein the first and second disk carriers (18, 24) are additionally brought in a positive-locking way into rotary driving connection with one another via the actuating device (46),
    wherein the actuating device (46) is in positive-locking rotary driving connection with the first disk carrier (18), and
    wherein the actuating device (46) is brought into rotary driving engagement in a positively-locking way with an end disk (42) of the disk set (34) to achieve the positive-locking rotary driving connection between the first and second disk carriers (18, 24).

2. The disk clutch (2) according to claim 1, wherein the actuating device (46) is brought into rotary driving engagement in a positively-locking way with a toothing (106) of the end disk (42), said toothing being in rotary driving engagement with the second disk carrier (24), a toothing section of the second disk carrier (24), or a disk support section (30) of the second disk carrier (24).

3. The disk clutch (2) according to claim 2, wherein said toothing being designed as wider than the toothing of the other disks (36, 38, 40) of the disk set (34) with respect to an axis of rotation (16) of the disk set (34).

4. The disk clutch (2) according to claim 1, wherein the actuating device (46) is displaceable from a first position, in which the first and second disk carriers (18, 24) are decoupled from one another, into a second position, in which a frictional connection exists between the first and second disk carriers (18, 24) via the disk set (34), and the actuating device (46) is additionally displaceable from the second position into a third position, in which the first and second disk carriers (18, 24) are in positive-locking rotary driving connection with one another via the actuating device (46).

5. The disk clutch (2) according to claim 4, wherein the actuating device (46) is displaceable in the same direction from the first position into the second position and from the second position into the third position.

6. The disk clutch (2) according to claim 4, wherein the actuating device (46) has a first actuating element (62) via which the actuating force (60) is applied to the disk set (34) and a second actuating element (64) for driving the first actuating element (62) on which the first actuating element (62) is supported or supportable, and wherein by displacing the actuating device (46) from the second position into the third position, the first actuating element (62) is displaceable relative to the second actuating element (64) from an initial position into a retracted position, and the second actuating element (64) is brought in a positive-locking way into rotary driving engagement with the second disk carrier (24).

7. The disk clutch (2) according to claim 6, wherein the second actuating element (64) is brought into a positive-locking way into rotary driving engagement with the second disk carrier (24) through a toothed section or a disk support section (30) of the second disk carrier (24).

8. The disk clutch (2) according to claim 7, wherein the second actuating element (64) is brought into a positive-locking way into rotary driving engagement with the second disk carrier (24) through the end disk (42).

9. The disk clutch (2) according to claim 1, wherein the actuating device (46) has a first actuating element (62) via which the actuating force (60) is applied to the disk set (34) and a second actuating element (64) for driving the first actuating element (62) on which the first actuating element (62) is supported or supportable.

10. The disk clutch (2) according to claim 9, wherein the first actuating element (62) is supported or supportable on the second actuating element (64) via a reset device (94) for resetting the first actuating element (62) into an initial position.

11. The disk clutch (2) according to claim 10, wherein the first actuating element (62) is displaceable counter to a reset force (96) of the reset device (94) from the initial position into the retracted position.

12. The disk clutch (2) according to claim 11, wherein the reset device (94) has a spring device (98) to generate a spring force (104) from which the reset force (96) results.

13. The disk clutch (2) according to claim 12, wherein the spring force (104) defines an angle of less than 45° with the resulting reset force (96).

14. The disk clutch (2) according to claim 9, wherein the second actuating element (64) is in positive-locking rotary driving connection with the first disk carrier (18) via the first actuating element (62), and/or the first actuating element (62) is designed as disk-like and/or annular.

15. The disk clutch (2) according to claim 9, wherein the first and second actuating elements (62, 64) are in positive-locking rotary driving connection with one another, wherein the first actuating element (62) has a toothing (82) which is in rotary driving engagement with a toothing (90) on the second actuating element (64), and/or the first actuating element (62) is in positive-locking rotary driving connection with the first disk carrier (18), wherein the first actuating element (62) has a toothing (80) which is in rotary driving engagement with a toothed section or a disk support section (22) of the first disk carrier (18).

16. The disk clutch (2) according to claim 15, wherein the toothing (90) on the second actuating element (64) is brought in a positive-locking way into rotary driving engagement with the end disk (42).

17. The disk clutch (2) according to claim 16, wherein the toothing (90) on the second actuating element (64) is brought in a positive-locking way into rotary driving engagement with a toothing (106) of the end disk (42) while achieving the positive locking rotary driving connection between the first and second disk carriers (18, 24).

18. The disk clutch (2) according to claim 15, wherein a stop (102) is provided between the first and second actuating elements (62, 64) via which the first actuating element (62) is supported or supportable on the second actuating element (64) in a retracted position.

19. The disk clutch (2) according to claim 18, wherein the stop (102) is arranged detachably on the first or second actuating element (62; 64) and/or is designed as a retaining ring.

20. The disk clutch (2) according to claim 12, wherein the spring force (104) of the spring device (98) acts substantially in the same direction as the reset force (96).

* * * * *